UNITED STATES PATENT OFFICE.

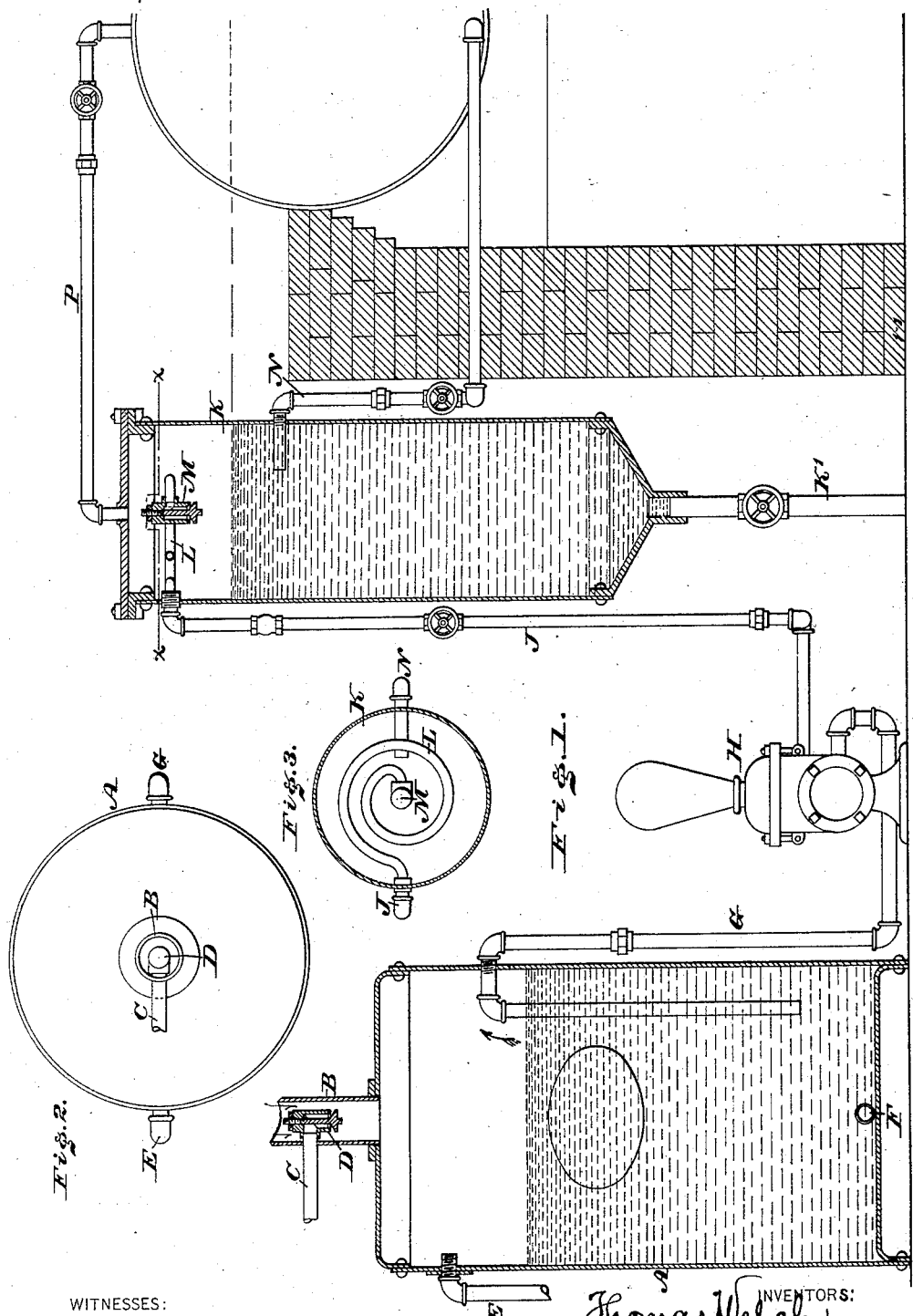

THOMAS WELCH AND THOMAS R. CROOKS, OF PHILADELPHIA, PA.

WATER-HEATING APPARATUS FOR BOILERS.

SPECIFICATION forming part of Letters Patent No. 338,453, dated March 23, 1886.

Application filed May 21, 1885. Serial No. 166,251. (No model.)

*To all whom it may concern:*

Be it known that we, THOMAS WELCH and THOMAS R. CROOKS, both citizens of the United States, residing in the city and county of Philadelphia, State of Pennsylvania, have invented a new and useful Improvement in Water-Heating Apparatus for Boilers, which improvement is fully set forth in the following specification and accompanying drawings, in which—

Figure 1 represents a partial vertical section and a partial side elevation of an apparatus for heating water and feeding boilers embodying our invention. Fig. 2 represents a top view of a portion thereof. Fig. 3 represents a horizontal section in line $x\,x$, Fig. 1.

Similar letters of reference indicate corresponding parts in the several figures.

The object of our invention is to utilize exhaust-steam from an engine or other source, and employ the same in connection with other means for heating the feed-water for a steam-boiler to a high temperature, as will be hereinafter fully set forth.

Referring to the drawings, A represents a tank, with which is connected a pipe, B, leading from the exhaust of the steam-engine, &c.

C represents a pipe, which is in communication with a supply of cold or fresh water, and opens into the pipe B, where it is provided with a rose or sprinkler, D.

At the side of the tank A, near the top thereof, is an overflow-pipe, E, and at the bottom a pipe, F, for discharge of sediment, &c., from said tank. Connected with the tank is a pipe, G, which is in communication with said tank and a pump, H, the latter being of any desired construction. Connected with said pump H is a pipe, J, which leads into the upper part of a cylinder or heater, K, the latter being properly supported adjacent to a steam-boiler, the end of the pipe J which is within the heater being coiled, as at L, and provided with a rose or sprinkler, M.

N represents a water-pipe leading from the boiler to the heater K, and opening thereinto below the water-line of the boiler; and P represents a steam-pipe leading from the boiler to the heater K, and opening thereinto above the coil L of the pipe J. The pipes are provided with the necessary cocks, check-valve, couplings, &c.

The operation is as follows: Exhaust-steam is directed by the pipe B into the tank A, and cool or fresh water by the pipe C into said pipe B, so that the descending steam passes through the sheet of water created by the rose D, and is thereby rapidly condensed, the water, partially warm, then entering the tank A, whence it is pumped into the heater K, where it is highly heated by the steam, and, being under pressure of steam, is forced into the boiler. The coil L provides a large heating-surface for the water as it enters the heater K, thus raising the temperature of the water as it flows through said coil, and the rose or sprinkler M discharges said water in the form of a sheet, in which condition it is subjected to the action of the steam admitted through the pipe P, and thus raised to a very high temperature, in which condition it is directed into the boiler, the effect of which is evident. The sediment in the heater is directed to the bottom thereof, where it may be blown off or otherwise discharged, for which purpose a pipe, K', is employed; and as the sediment in the tank is removable therefrom, it will be seen that the boiler is fed with comparatively pure water through the pipe N.

The heads of the roses D M may be moved nearer to or farther from the adjacent end of the pipe to which they are attached, so as to adjust the thickness of the sheets of water formed by the roses.

Having thus described our invention, what we claim as new, and desire to secure by Letters Patent, is—

1. The tank A, having the exhaust-steam pipe, with the water-pipe C, having an adjustable sprinkler connected to said pipe C and opening in said pipe B, and the discharge-pipe G, having its inner open end near the bottom of said tank, substantially as and for the purpose set forth.

2. The tank A, having an adjustable water-sprinkler opening into an inlet-steam exhaust-pipe, in combination with an outlet-pipe having its inner end near the bottom of said tank, a force-pump, a heater, and an inlet-pipe for said heater having an adjustable sprinkler, substantially as described.

3. The tank A, in combination with pump H, pipes G and J, said pipe having coil L and sprinkler M, heater K, and a boiler, steam-pipe P, communicating with said boiler and opening into said heater above said coil M, and water-pipe N, also communicating with the boiler and opening into the heater below the water-line of the said boiler, all of said parts being arranged, combined, and operating substantially as described.

4. The heater K, in combination with the inlet-pipe J, having a coiled end portion within the said heater, and provided with the adjustable sprinkler M, the steam-pipe P, a boiler, and the water-pipe N, the said steam-pipe opening into the heater above the said sprinkler M, and the water-pipe N opening into the said heater below the water-level of the said boiler, substantially as and for the purpose set forth.

THOMAS WELCH.
THOMAS R. CROOKS.

Witnesses:
JOHN A. WIEDERSHEIM,
A. P. GRANT.